United States Patent [19]

Abraham et al.

[11] Patent Number: 5,247,669
[45] Date of Patent: Sep. 21, 1993

[54] PERSISTENT DATA INTERFACE FOR AN OBJECT ORIENTED PROGRAMMING SYSTEM

[75] Inventors: Robert L. Abraham; Richard E. Moore, both of Marietta; William L. Rich, Stone Mountain; Floyd W. Shackelford, Buford; John R. Tiller, Jr., Peachtree City, all of Ga.; Richard S. Briggs, Jr., Bloomingdale, Ill.

[73] Assignee: International Business Machines Corporation, Armonk, N.Y.

[21] Appl. No.: 1,210

[22] Filed: Jan. 6, 1993

Related U.S. Application Data

[63] Continuation of Ser. No. 425,824, Oct. 23, 1989, abandoned.

[51] Int. Cl.$^5$ .................................... G06F 7/00
[52] U.S. Cl. .......................... 395/600; 364/DIG. 2; 364/962; 364/963.3; 364/965.79
[58] Field of Search .................. 364/DIG. 1 MS File, 364/DIG. 2 MS File; 395/600

[56] References Cited

U.S. PATENT DOCUMENTS

| | | | |
|---|---|---|---|
| 4,506,326 | 3/1985 | Shaw et al. | 364/300 |
| 4,509,119 | 4/1985 | Gumaer et al. | 364/200 |
| 4,604,686 | 8/1986 | Reiter et al. | 364/200 |
| 4,631,664 | 12/1986 | Bachman | 364/200 |
| 4,642,762 | 2/1987 | Fisanick | 364/300 |
| 4,747,072 | 5/1988 | Robinson et al. | 364/900 |
| 4,769,772 | 9/1988 | Dwyer | 364/300 |
| 4,791,550 | 12/1988 | Stevenson et al. | 364/200 |
| 4,811,199 | 3/1989 | Kuechler et al. | 364/200 |
| 4,821,220 | 4/1989 | Duisberg | 364/578 |
| 4,841,433 | 6/1989 | Hakim et al. | 364/200 |
| 4,853,843 | 8/1989 | Ecklund | 364/200 |
| 4,989,132 | 1/1991 | Mellender et al. | 364/200 |
| 5,008,786 | 4/1991 | Thatte | 364/200 |

OTHER PUBLICATIONS

IBM Technical Disclosure Bulletin, "Dynamic Positioning Of Object Data Portions Within A Single Presentation Area", pp. 231-232, vol. 31, No. 11, Apr. 1989.

IBM Technical Disclosure Bulletin, "Rules For Interchange Objects In A Mixed Object Document Data Stream", pp. 196-197, vol. 32, No. 1, Jun. 1989, Apr. 1989.

European Search Report, Appln. No. EP 90 48 0155, Jul. 28, 1992.

*The Treatment of Persistent Objects in Arjuna,* G. N. Dixon et al., The Computer Journal, vol. 32, No. 4, 1989, pp. 323-332.

*Inheritance of Synchronization and Recovery Properties in Avalon/C++,* D. L. Detlefs et al., IEEE, Dec., 1988, pp. 57-69.

*Object Management in a Persistent Smalltalk System,* A. Straw et al., Software Practice & Experience, Aug. 1989, vol. 19(8), pp. 719-737, Wiley & Sons, Inc., Aug. 1989.

*Primary Examiner*—Thomas M. Heckler
*Attorney, Agent, or Firm*—Bell, Seltzer, Park & Gibson

[57] ABSTRACT

A persistent data interface for an object oriented programming system provides a persistent class object. Any object which must survive a run time session is arranged to inherit from the persistent class object. Any object which inherits from the persistent class automatically becomes a persistent object. The persistent class includes a "materialize" method for automatically retrieving a persistent object from nonvolatile memory and placing it in volatile memory if the persistent object cannot be located in volatile memory. A "dematerialize" method is also included for removing an object from volatile memory and storing it in nonvolatile memory. Data integrity of the system is thereby preserved.

32 Claims, 13 Drawing Sheets

| OBJECT ID | ADDRESS IN MEMORY |
|---|---|
| INSTANCE_A | A640:0410 |
| XXXXXXXX | 1C92:0050 |
| ... | ... |
| XXXXXXXX | 214A:B600 |

| OBJECT ID | ADDRESS IN MEMORY |
|---|---|
| INSTANCE_A | A640:0410 |
| XXXXXXX | 1C92:0050 |
| ... | ... |
| XXXXXXX | 214A:B600 |
| INSTANCE_B | 0640:09AF |

| OBJECT ID | ADDRESS IN MEMORY |
|---|---|
| INSTANCE_A | A640:0410 |
| XXXXXXXX | 1C92:0050 |
| ... | ... |
| XXXXXXXX | 214A:B600 |

| OBJECT ID | ADDRESS IN MEMORY |
|---|---|
| XXXXXXXX | 1C92:0050 |
| ... | ... |
| XXXXXXXX | 214A:B600 |

| OBJECT ID | ADDRESS IN MEMORY |
|-----------|-------------------|
| XXXXXXX   | 1C92:0050         |
| ...       | ...               |
| XXXXXXX   | 214A:B600         |

RAM

INSTANCE_A'

DATABASE

INSTANCE_A

FIG. 18.

| OBJECT ID | ADDRESS IN MEMORY |
|-----------|-------------------|
| XXXXXXXX  | 1C92:0050         |
| ...       | ...               |
| XXXXXXXX  | 214A:B600         |

FIG. 19.

| OBJECT ID | ADDRESS IN MEMORY |
|---|---|
| XXXXXXX | 1C92:0050 |
| ... | ... |
| XXXXXXX | 214A:B600 |

PERSISTENT DATA INTERFACE FOR AN OBJECT ORIENTED PROGRAMMING SYSTEM

This is a continuation of co-pending application Ser. No. 07/425,824 filed on Oct. 23, 1989 now abandoned.

FIELD OF THE INVENTION

This invention relates to an object oriented programming system, and more particularly to an apparatus and process for handling objects which are stored in nonvolatile memory in an object oriented programming system.

BACKGROUND OF THE INVENTION

Object Oriented Programming systems and processes have been the subject of much investigation and interest in state of the art data processing environments. Object Oriented Programming is a computer program packaging technique which provides reusable and easily expandable programs. In contrast with known functional programming techniques which are not easily adaptable to new functional requirements and new types of data, object oriented programs are reusable and expandable as new requirements arise. With the ever increasing complexity of computer based systems, object oriented programming has received increased attention and investigation.

In an object oriented programming system, the primary focus is on data, rather than functions. Object oriented programming systems are composed of a large number of "objects". An object is a data structure and a set of operations or functions that can access that data structure. The data structure may be represented as a "frame". The frame has many "slots", each of which contains an "attribute" of the data in the slot. The attribute may be a primitive (i.e. an integer or string) or an Object Reference which is a pointer to another object's instance or instances (defined below). Each operation (function) that can access the data structure is called a "method".

FIG. 1 illustrates a schematic representation of an object in which a frame is encapsulated within its methods. FIG. 2 illustrates an example of an object, in which the data structure relates to employee data, and a number of methods surround this data structure. One method, for example, obtains the age of an employee. Each defined object will usually be manifested in a number of instances. Each instance contains the particular data structure for a particular example of the object. For example, an object for individual employee named Joyce Smith is an instance of the "employee" object.

Object oriented programming systems provide two primary characteristics which allow flexible and reusable programs to be developed. These characteristics are referred to as "encapsulation" and "inheritance". As may be seen from FIG. 1, the frame is encapsulated by its methods (functions). A wall of code has been placed around each piece of data. All access to the frame is handled by the surrounding methods. Data independence is thereby provided because an object's data structure is accessed only by its methods. Only the associated methods know the internal data structure. This ensures data integrity.

The "inheritance" property of object oriented programming systems allows previously written programs to be broadened by creating new superclasses and subclasses of objects. New objects are described by how they differ from preexisting objects so that entirely new programs need not be written to handle new types of data or functions.

FIG. 3 illustrates the inheritance property. For ease of illustration, the objects are illustrated as rectangles rather than as circles, with the object name at the top of a rectangle, the frame below the object name and the methods below the frame. Referring to FIG. 3, three object classes are illustrated for "salesperson", "employee" and "person", where a salesperson is a "kind of" employee, which is a "kind of" person. In other words, salesperson is a subclass of employee and employee is the superclass of salesperson. Similarly, employee is the subclass of person and person is the superclass of employee. Each class shown includes three instances. B. Soutter, W. Tipp and B. G. Blue are salespersons. B. Abraham, K. Yates and R. Moore are employees. J. McEnro, R. Nader and R. Reagan are persons. In other words, an instance is related to its class by an "is a" relation.

Each subclass "inherits" the frame and methods of its superclass. Thus, for example, a salesperson frame inherits age and hire date objects from the employee superclass as well as promote methods. Salesperson also includes a unique quota attribute and a pay commission method. Each instance can access all methods and frames of its superclass, so that, for example, B. G. Blue can be promoted.

In an object oriented system, a high level routine requests an object to perform one of its methods by sending the object a "message" telling the object what to do. The receiving object responds to the message by choosing the method that implements the message name, executing this method and then returning control to the calling high level routine, along with the results of the method.

It will be understood by those having skill in the art that an object oriented programming system typically runs on a data processor which includes volatile memory, i.e., memory which is erased or overwritten during when a session is terminated or when power is removed from the data processor, and nonvolatile memory such as direct access storage devices (DASD-disk files) or tape files in which data is permanently stored. The volatile memory is often referred to as Random Access Memory (RAM) or simply as "memory". The nonvolatile memory is often referred to as a "database". The term database, as used herein, refers to any physical, nonvolatile data storage medium, rather than to a particular database technology or product.

It will also be understood by those having skill in the art that object oriented programming systems include temporary objects, which are only used during a particular session and may be destroyed thereafter, and permanent objects which must survive a particular run time session for later use. Temporary objects are typically stored in RAM, while permanent objects must be stored in the database. Permanent objects are often called "persistent" objects.

In an object oriented programming system, persistent objects must be handled properly in order to ensure data integrity of the system. Although the existence of persistent objects in an object oriented programming system is well known, the art has heretofore not provided an interface for defining and handling persistent objects in an object oriented programming system. Heretofore, when an object was deemed to be persistent, special methods had to be developed and used, to read the object from and write the object to the database, in order to preserve database integrity. These special methods greatly increased the complexity of object oriented programming systems. Moreover, these special methods increased the likelihood that a persistent object was not handled properly, resulting in a loss of data integrity, because the user had to decide when to move the object into and out of the database.

SUMMARY OF THE INVENTION

It is therefore an object of the invention to provide an interface for handling persistent objects in an object oriented programming system.

It is another object of the invention to provide a process and apparatus for handling persistent objects so that special methods need not be developed for every persistent object.

It is still another object of the invention to provide a process and apparatus for handling persistent objects in order to automatically preserve database data integrity.

These and other objects are provided according to the invention, by providing a "persistent class" of objects in an object oriented programming system. The persistent class includes all methods necessary for ensuring that a persistent object is handled properly. Any object which must survive a run-time session may inherit from the persistent class. According to the basic concepts of object oriented programming systems, an object which inherits from the persistent class automatically becomes a persistent object.

According to the present invention, at least two methods are associated with the persistent class of objects. These methods are the "Materialize" and "Dematerialize" methods. The "Materialize" method automatically retrieves a persistent object from nonvolatile memory (the database) and places it into volatile memory (RAM) if the persistent object cannot be located in RAM. If the persistent object cannot be located in the database, a failure indicator is provided.

The "Dematerialize" method removes an object from volatile memory and automatically performs predetermined actions on the corresponding object in nonvolatile memory depending on whether changes have been made to the object while it was in volatile memory. In order to "Dematerialize" a persistent object, a test is first made to see if any changes have been made to the persistent object in RAM, after it was read from the database. If not, the persistent object is removed from RAM memory. If the persistent object was newly created, and does not currently exist in the database, the persistent object is written into the database and removed from RAM. Also, if changes were made to the persistent object, the changed persistent object is written into the database in place of the existing persistent object, and removed from RAM. Finally, if the persistent object is to be deleted, it is deleted from RAM and the database.

The persistent object class provides a simple interface process and apparatus for automatically handling persistent objects in an object oriented programming system, with minimal overhead. Data integrity of the system is thereby preserved. The persistent class allows persistent objects in the database to automatically appear in RAM whenever referenced, and ensures that the database automatically reflects any changes which had been made to the RAM copy of the object. A persistent data interface for an object oriented programming system is thereby provided. A persistent data interface for a conventionally programmed computer system according to the present invention may also be provided.

BRIEF DESCRIPTION OF THE DRAWINGS

FIGS. 18 through 20 illustrate the contents of volatile and nonvolatile memory and an object list for a third example of a "dematerialize" method according to the present invention.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

OBJECT ORIENTED COMPUTER SYSTEM

In an object oriented computer system, work is accomplished by sending action request messages to an object which contains (encapsulates) data. The object will perform the requested action on the data according to its predefined methods. The requestor of the action need not know what the actual data looks like or how the object manipulates it.

An object's class defines the types and meanings of the data and the action requests (messages) that the object will honor. The individual objects containing data are called instances of the class. Classes generally relate to real-world things. For example, "Parts" may be a class. The data elements (slots) of a part might be a part number, a status and a part type. The instances of this class represent individual parts, each with its own part number, status, and type information. The programs performing the requested actions are called methods of the class.

Object classes can be defined to be subclasses of other classes. Subclasses inherit all the data characteristics and methods of the parent class. They can add additional data and methods, and they can override (redefine) any data elements or methods of the parent class. While most messages are sent to object instances, the message that requests that a new instance be created is sent to an object class. The class will cause a new instance to be created and will return an object identifier by which that object will be known.

The sender of an action request message need not know the exact class of the object to which it is sending the message. As long as the target object either defines a method to handle the message or has a parent class that defines such a method, then the message will be handled using the data in the object instance and the method in its class or its parent class. In fact, it need not be an immediate parent, but may be a parent's parent, etc. The sender of the method need only have the object ID of the receiving object. This property of object oriented systems is called "inheritance". The inheritance property is used in the present invention.

Figure 1:
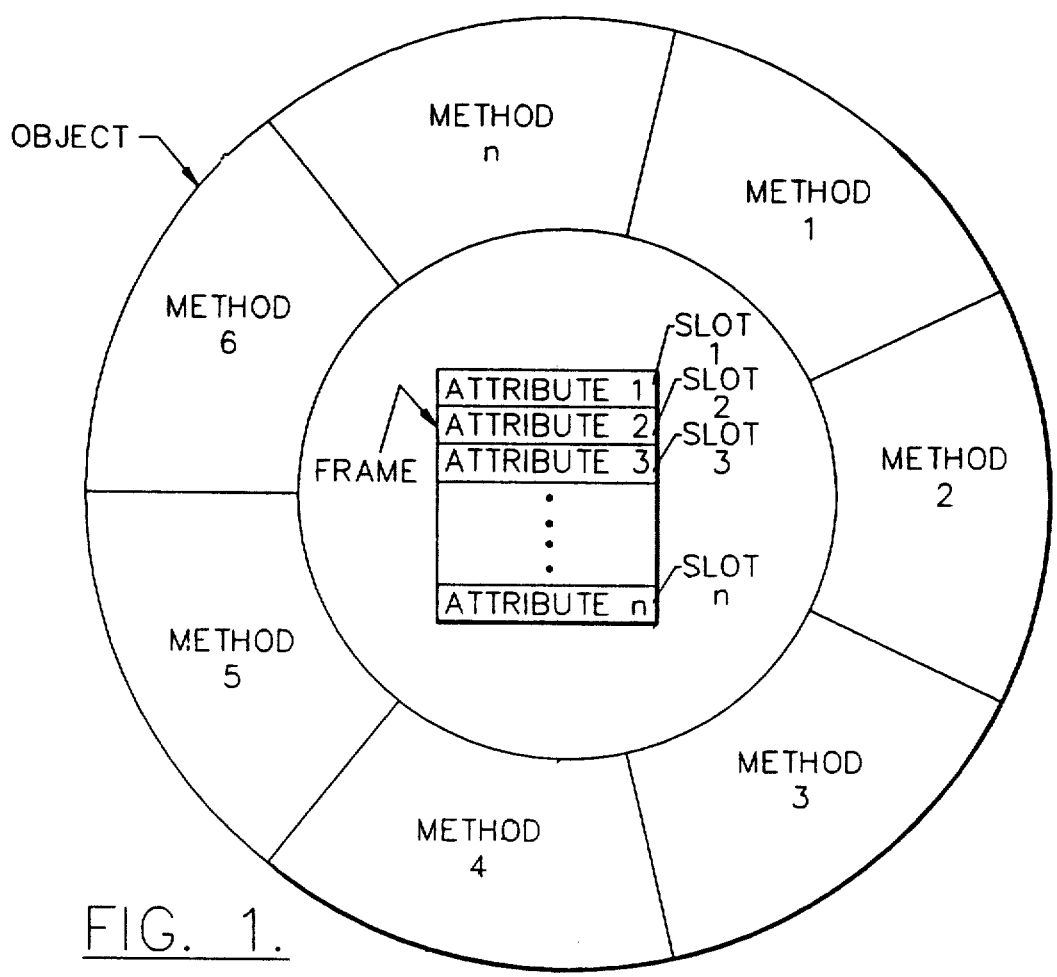
FIG. 1 illustrates a schematic representation of an object.
Figure 2:
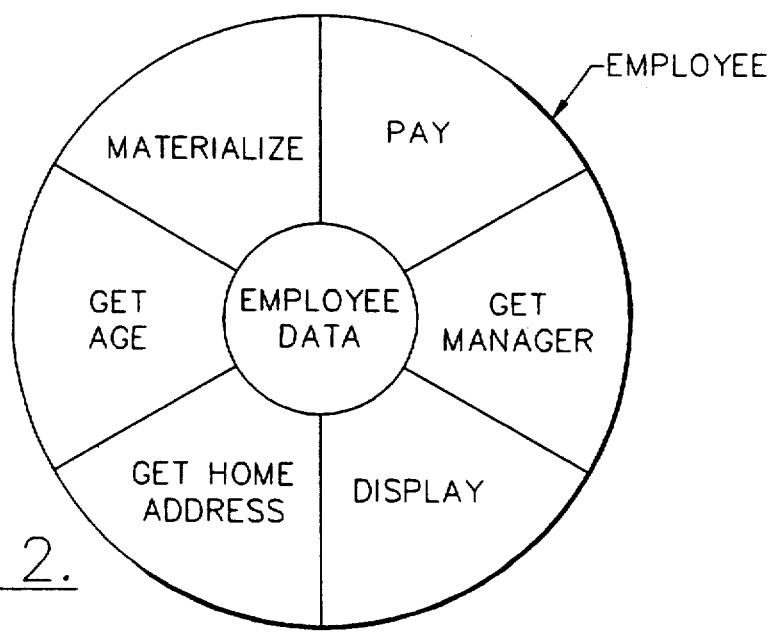
FIG. 2 illustrates a schematic representation of an example of an object.
Figure 3:
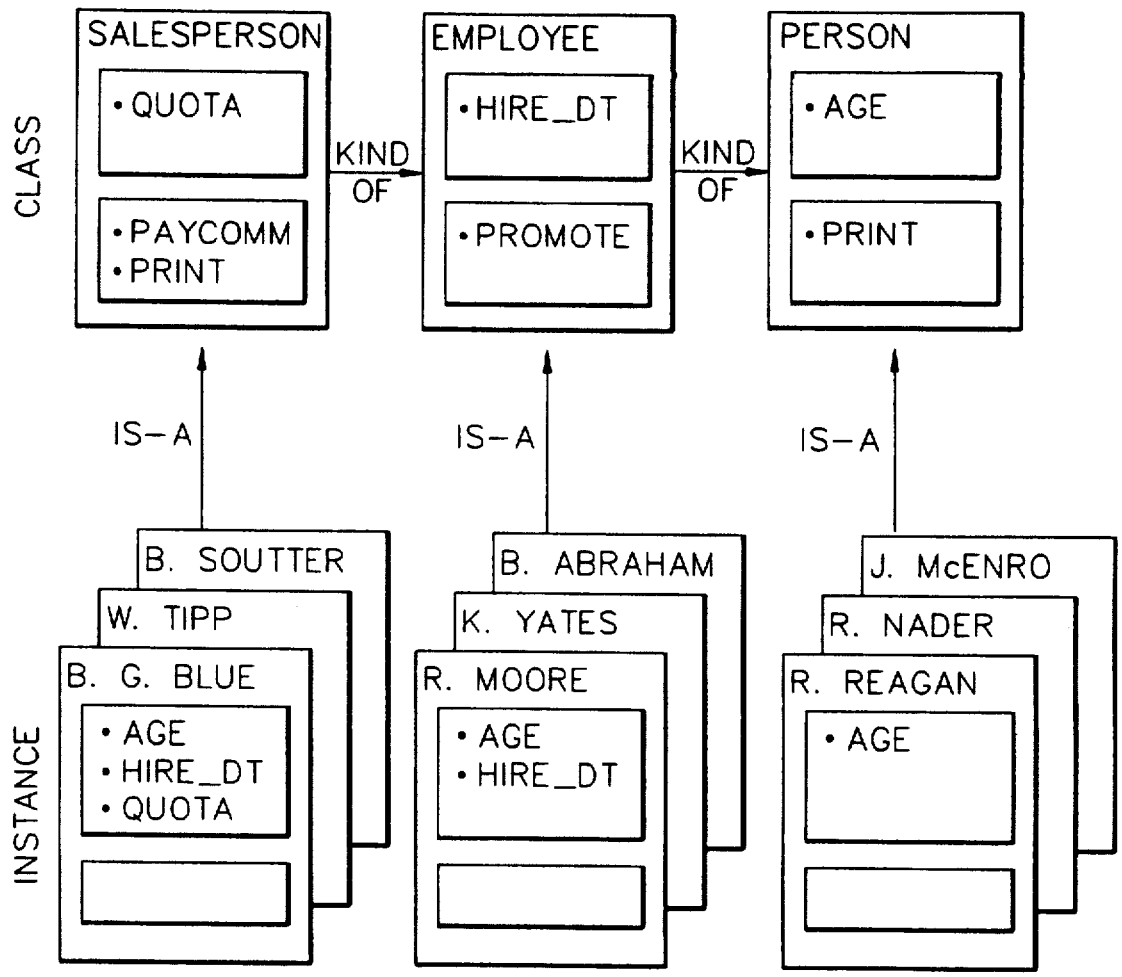
FIG. 3 illustrates the inheritance property of objects.
Figure 4:
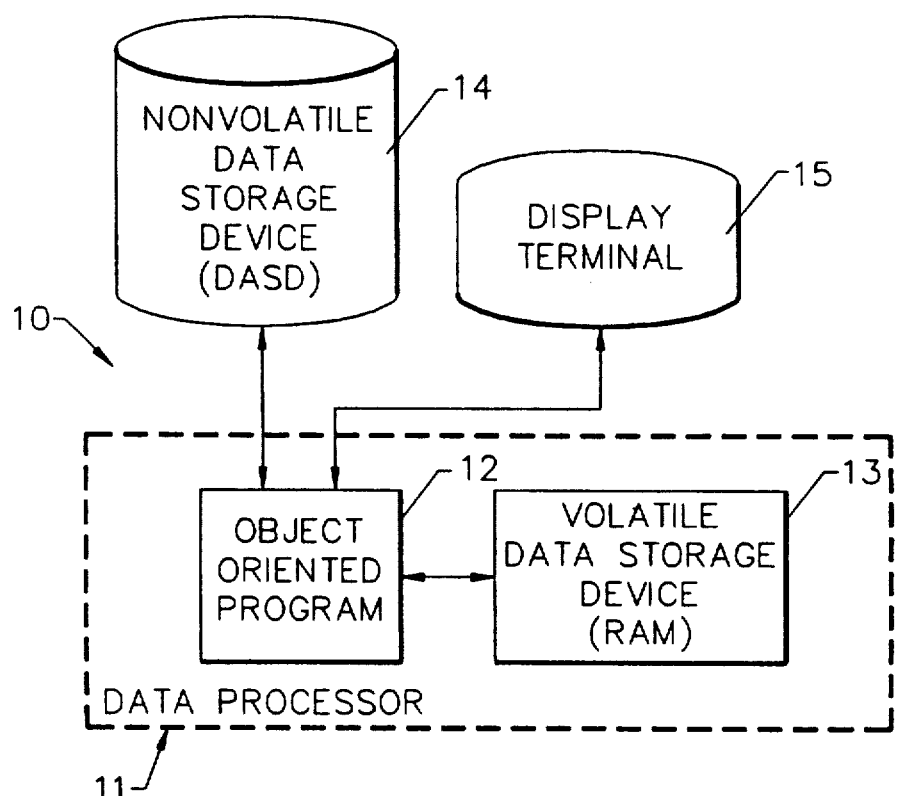
FIG. 4 illustrates a schematic block diagram of an object oriented computer system according to the present invention.

Referring now to FIG. 4, a schematic block diagram of an object oriented computer system 10 is illustrated. The system 10 includes a data processor 11 which may be a mainframe computer, minicomputer or personal computer. For large databases having multiple users, a mainframe computer is typically employed. As is well known to those having skill in the art, the data processor 10 includes a volatile data storage device 13, typically random access memory (RAM) for providing a working store for active data and intermediate results. Data in RAM 13 is erased when power to the data processor 11 is removed or a new user session is begun. System 10 also includes a nonvolatile data storage device 14 for permanent storage of objects. Device 14 may be a direct access storage device (DASD-a disk file) a tape file, an erasable optical disk or other well known device. Nonvolatile data storage device 14 will also be referred to herein as a "database". Volatile data storage device 13 will also be referred to as "memory". A display terminal 15 including a cathode ray tube (CRT) or other display, and a keyboard, is also shown.

An object oriented operating program 12 is also included in data processor 11. Object oriented operating program 12 may be programmed in object oriented languages such as "C" or "Smalltalk" or variations thereof, or in conventional programming languages such as FORTRAN or COBOL. The design of an object oriented operating program 12 is well known to those skilled in the art of object oriented programming systems, and will only be described generally below.

Figure 5:
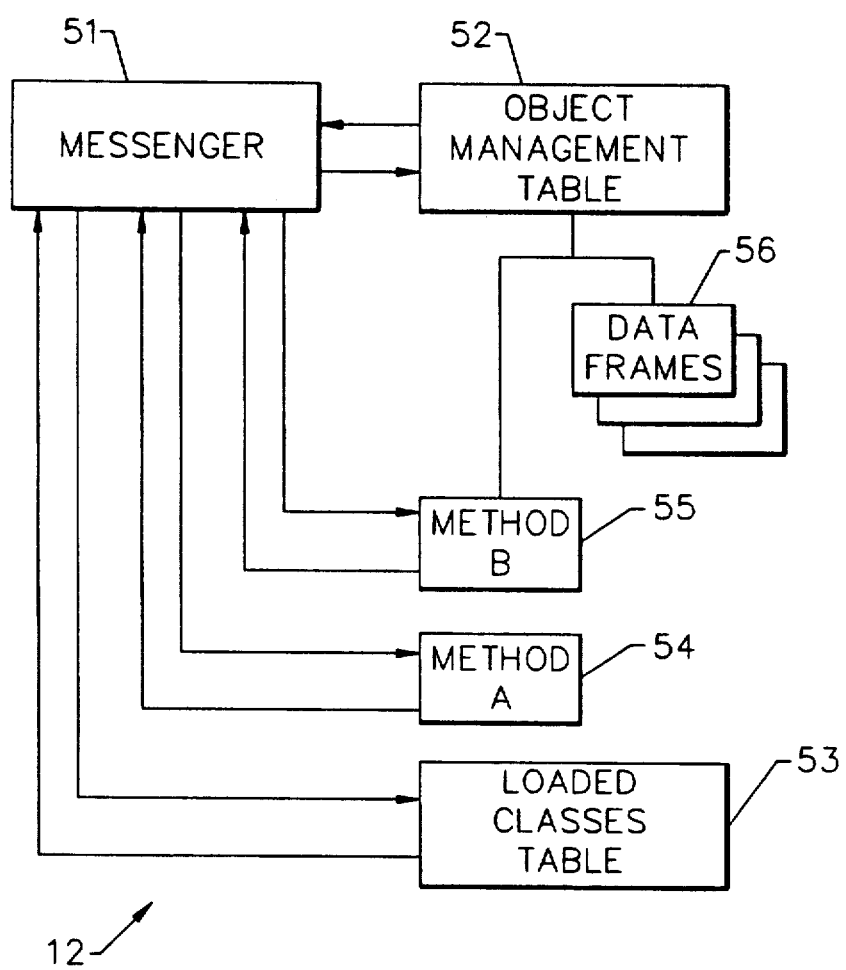
FIG. 5 illustrates a schematic block diagram of an object oriented program according to the present invention.

Referring now to FIG. 5, the main components of an object oriented program (12, FIG. 4) will be described. A more detailed description of the design and operation of an object oriented program is provided in "Object Oriented Software Construction", by Bertrand Meyer, published by Prentice Hall in 1988, the disclosure of which is incorporated herein by reference.

Referring to FIG. 5, object oriented program 12 includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented Program 12 will now be described for the example illustrated in FIG. 5, in which Method A (block 54) of an object sends a message to Method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

PERSISTENT OBJECT CLASS

Within every object oriented programming system there are objects which are temporary objects and objects which need to survive any particular run-time session for later use. Those objects which need to survive a run-time session are called persistent objects. Persistent and non-persistent objects are manipulated by object oriented operating program 12 when they are stored in RAM 13. However, at the conclusion of a run-time session, persistent objects must be automatically stored in database 14, whereas non-persistent objects may simply be erased from RAM 13. Moreover, persistent objects must automatically appear in RAM 13 wherever they are referenced by object oriented operating program 12, and any changes which have been made to a persistent object in RAM 13 must also be made to the persistent object in database 14.

Prior art object oriented programming systems do not provide any automatic way for objects to be persistent. The system programmer had to develop unique methods which read an object from and write the object to the database. Furthermore, users of an object had to decide when to move the object into and out of the database.

According to the invention, a persistent object class is provided to support all required operations for maintaining integrity of persistent objects. Any object which is desired to be persistent will be arranged to inherit from the persistent object class of the present invention. In other words, all persistent objects are children of the persistent object parent. Accordingly, objects become persistent simply by inheriting from the persistent class.

Children of the persistent class need only define a few deferred methods, whose use is taken care of automatically by the persistent class methods.

PERSISTENT CLASS METHODS

The Persistent Class of the present invention includes two methods which are used by a message to retrieve objects from and update objects within the database. These methods are the Materialize and Dematerialize methods. Deferred methods are also defined to fully implement the automatic persistent data interface. As is well known to those having skill in the art, a deferred method is defined by a class but is only implemented by descendants (children) of the class. The function of the deferred method is precisely specified by the Persistent Class of the present invention, although it is implemented by children of the Persistent Class. The Persistent Class methods are:

Dematerialize

The Dematerialize method expects three deferred methods to be defined by each child class, namely: the DB_Update, DB_Delete, and the DB_insert methods. When the Dematerialize method is invoked by a message, it in turn determines which of the three deferred methods to invoke. Each deferred method will encapsulate all the database access code needed to either Update, Delete, or Insert the object into the database.

Materialize

The Materialize method expects a deferred method to be defined by each child class, namely: the DB_Select method. When the Materialize method is invoked by a message, it invokes the DB_Select method of the specified child object. This DB_Select method will encapsulate all the database access code needed to fill in the frame previously allocated by the object oriented operating program.

DB_Delete

This deferred method contains the low-level code necessary to actually delete a specific instance from the database.

DB_Insert

This deferred method contains the low-level code necessary to actually insert a specific instance into the database.

DB_Select

This deferred method contains the low-level code necessary to retrieve a specific instance from the database.

DB_Update

This deferred method contains the low-level code necessary to actually update a specific instance in the database.

Delete

This method is used by clients of an instance which desire to delete the instance. It simply sets the Demat_State to 'delete' as appropriate.

Demat_State

This instance attribute is used as a state indicator of the instance. It has four states:
'delete'
   The instance is to be deleted from the database and removed from memory when it is dematerialized.
'insert'
   The instance is to be inserted into the database and removed from memory when it is dematerialized.
'nothing'
   The instance is to be removed from memory when it is dematerialized. The database copy of this instance is to remain unchanged.
'update'
   The instance is to updated in the database and removed from memory when it is dematerialized.

Last_Update_DTS

This attribute is the Last Update-Time-Stamp. It is used to provide lock protection of the instance in a multi-user database. Every time the instance is dematerialized, the value of Last_Update_DTS of the instance in RAM is checked against the Last_Update_DTS of the instance in the database. If they match, then the dematerialization will be allowed to proceed. If they are different, then the instance was updated after the present in-memory copy was made and the Dematerialize is not allowed.

Notify

This method is used by methods of a persistent instance which desire to modify the persistent instance. It simply sets the Demat_State to 'update' as appropriate.

DETAILED DESCRIPTION OF PERSISTENT CLASS METHODS

In order to fully describe the detailed operation of the Persistent Class methods, to those having skill in the art, the operation of these methods will be described by way of six Examples. Example 1 describes the Materialize method, when the referenced object is in the database but not in RAM (also referred to as "memory"). Example 2 describes the Materialize method, when the referenced object is not in the database and must be created. Example 3 describes the Dematerialize method when no changes have been made to the referenced object while in RAM. Example 4 describes the Dematerialize method for a newly created persistent object. Example 5 describes the Dematerialize method when a persistent object has ben modified in RAM. Finally, Example 6 describes the Dematerialize method when a persistent object is deleted from the database.

For every Example, assume there exists an instance called Instance_A, of object type Class_A, already in memory, which has an object reference (abbreviated OREF) to another instance called Instance_B, of object type Class_B.

Additionally, allow Class_A and Class_B to inherit from the Persistent Class of the present invention. In particular, Class_A is a "person" type, and Instance_A is an instance of this type. That is, Instance_A is a person. Class_B is a "door" type, and Instance_B is an instance of this type. That is, Instance_B is a door. Instance_A, a person, knows about Instance_B, a door. Each Example will demonstrate how Instance_B (the door) is automatically manipulated by the Persistent Class as driven by a message from Instance_A (the person).

In all examples, the term "database" is used to refer to nonvolatile data storage device 14 (FIG. 4). The terms "RAM" or "memory" are used to refer to a volatile data storage device 13 (FIG. 4). It will be understood by those having skill in the art that the particular addresses shown in the "address in memory" column of FIGS. 7, 9, 11, 13, 16, 19 and 22 are arbitrary and are provided for illustration only.

EXAMPLE 1

Materialize: Referenced Object is in the Database

In this Example, Instance_A sends a message to Instance_B using the OREF it contains of type Instance_B's class. Additionally, Instance_B is not currently in memory, but rather in the database. Instance_A's message to Instance_B will succeed because of the automatic materialization provided to all classes which inherit from the persistent class.

Figures 6, 7:
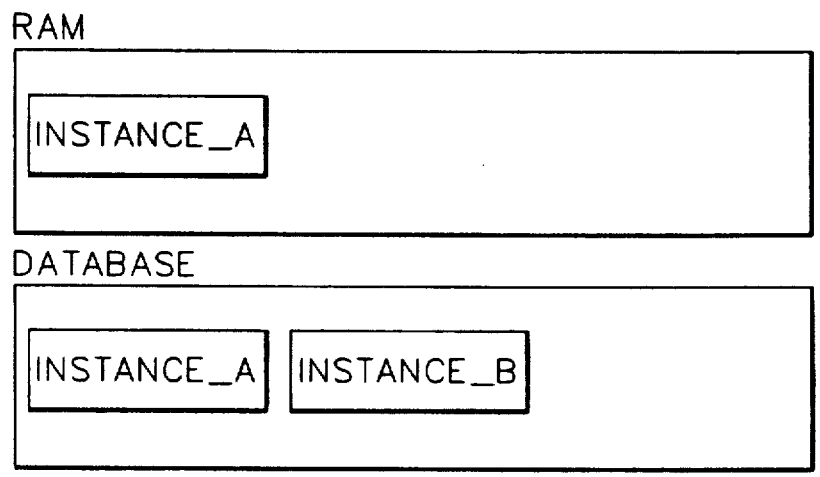
FIGS. 6 through 9 illustrate the contents of volatile and nonvolatile memory and an object list for a first example of a "materialize" method according to the present invention.

1. Initially, the system state appears as shown in FIG. 6.
2. Suppose Instance_A sends a message to Instance_B. For example, the "person" object has asked the "door" to open. The message within a method of the person class may be as follows:

MyDoor.Open;

where MyDoor is Instance_A's OREF to Instance_B and Open is an instance method of Class_B.

3. Upon execution of this message, the messenger (51, FIG. 5) would attempt to locate Instance_B, the door, in memory. The Object Manager maintains a list of all in-memory objects (Object Management Table 52, FIG. 5). Currently, however, the table appears as shown in FIG. 7, where xxxxxxxx are other unrelated objects also in memory at this time. The messenger will not be able to locate Instance_B in the Object Manager's table.
4. Since the Messenger cannon find Instance_B in the Object Manager's table of in-memory objects, and because Class_B has inherited from the Persistent class, the Messenger next sends a message to the object itself. That is:

Object.Materialize;

The Persistent class contains this method and by virtue of the fact that Class_B inherits from Persistent, Instance_B will be able to accept this message call.

Figures 8, 9:
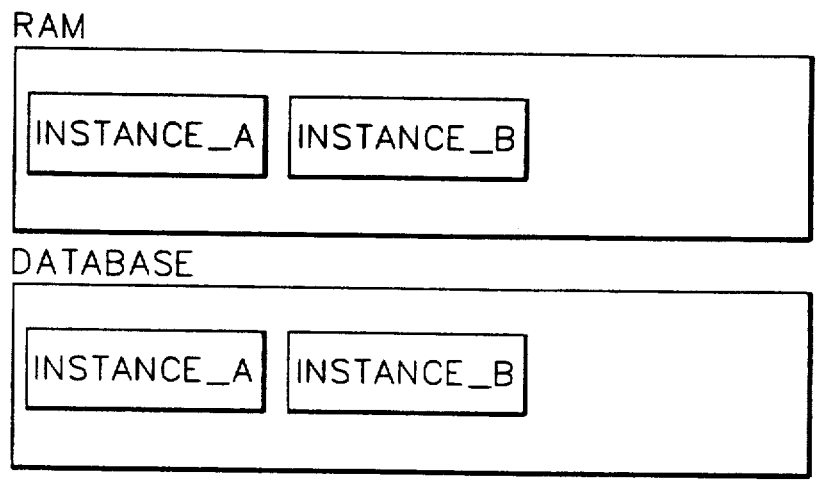

5. The Materialize method's provides a consistent interface to the underlying DB_Retrieve method which is deferred to each child class. The Materialize, therefore, issues a call to the DB_Retrieve method:

SELF.DB_Retrieve;

6. Class_B's DB _Retrieve method knows how to:
   a. search the database for instances of type Class_B, and
   b. load instances of type Class_B into memory. Instance_B is an instance of type Class_B. Accordingly, DB_Retrieve determines that Instance_B is in fact in the database, loads Instance _B into memory, and returns to the Materialize method indicating success. The system state now appears as shown in FIG. 8.
7. The Materialize method then sets the Persistent Class Demat_State instance attribute to 'nothing' and returns a success indicator to the Messenger.
8. The messenger understands that the materialize was successful, so it then asks the Object Manager to make an entry in its table to indicate that Instance_B is now in memory. The in-memory object table now appears as shown in FIG. 9.
9. Finally, the Messenger routes the message to Instance_B's Open method.

EXAMPLE 2

Materialize: Reference Object not in the Database

Figures 10, 11:
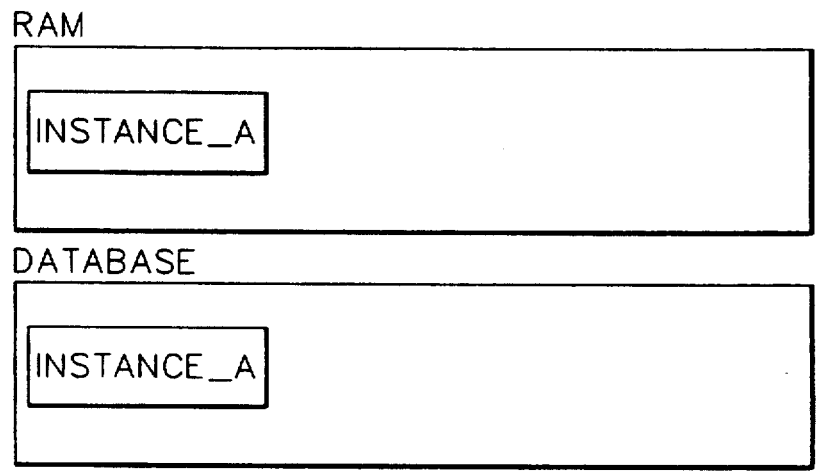
FIGS. 10 and 11 illustrate the contents of volatile and nonvolatile memory and an object list for a second example of a "materialize" method according to the present invention.

In this Example, Instance_A sends a message to Instance_B using the OREF it contains of type Instance_B's class. Additionally, Instance_B is not currently in memory, nor is it in the database (FIG. 10). Instance_A's message to Instance_B will fail because there is no object which has that particular object id either in memory nor in the database. In this case, it is highly probable that Instance_B has been deleted without Instance_A's knowledge.

1. Initially, the system state appears as shown in FIG. 10.
2. Suppose Instance_A sends a message to Instance_B. For example, the person object has asked the door to open. The message within a method of the person class may be as follows:

MyDoor.Open;

where MyDoor is Instance_A's OREF to Instance_B and Open is an instance method of Class_B.

3. Upon execution of this message, the messenger would attempt to locate Instance_B, the door, in memory. The Object Manager maintains a list of all in-memory objects. Currently, however, the table appears as shown in FIG. 11, where xxxxxxxx are other unrelated objects also in memory at this time. The messenger will not be able to locate Instance_B in the Object Manager's table.
4. Since the Messenger cannot find Instance_B in the Object Manager's table of in-memory objects, and because Class_B has inherited from the Persistent class, the Messenger next sends a message to the object itself. That is:

Object.Materialize;

Persistent class contains this method and by virtue of the fact that Class_B inherits from Persistent, Instance_B will be able to accept this message call.

5. The Materialize method provides a consistent interface to the underlying DB_Retrieve method which is deferred to each child class. The Materialize, therefore, issues a call to the DB_Retrieve method:

SELF.DB_Retrieve;

6. Class_B's DB_Retrieve method knows how to:
   a. search the database for instances of type Class_B, and
   b. load instances of type Class_B into memory. Instance_B is an instance of type Class_B. Accordingly, DB_Retrieve determines that Instance_B is not in the database. It returns to the Materialize method indicating failure. The system state remains unchanged.
7. The Materialize method then returns a failure indicator to the Messenger.

8. The Messenger understands that the materialize was unsuccessful, so it aborts the message processing with an "Invalid_Object_ID" exception.

EXAMPLE 3

Dematerialize: No Changes to Referenced Object

In this Example, an object which was earlier materialized from the database is asked to dematerialize itself, but no changes have been made to the object while it was in memory.

Figures 12, 13:
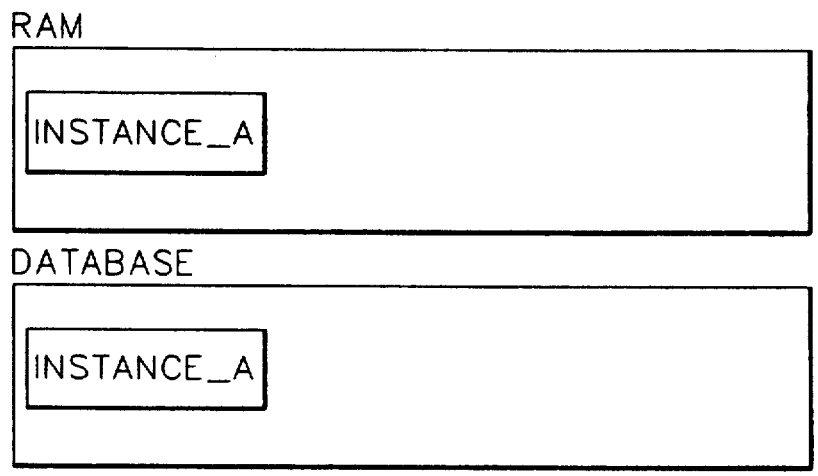
FIGS. 12 through 14 illustrate the contents of volatile and nonvolatile memory and an object list for a first example of a "dematerialize" method according to the present invention.
Figure 14:
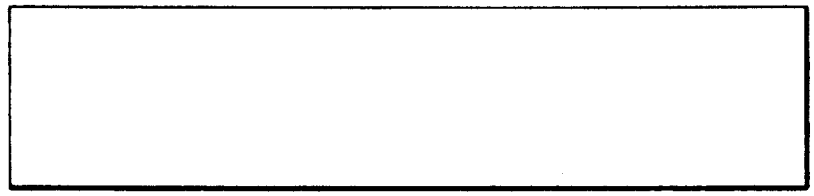
Figure 14:
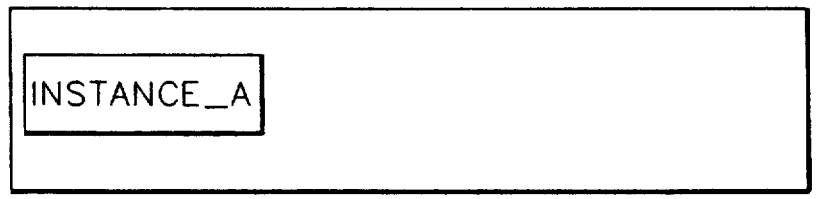

1. Initially, the system state appears as shown in FIG. 12.
2. For some reason, the Messenger decides it is time to dematerialize persistent objects. The Messenger therefore sends a Dematerialize request to Instance_A:

Object.Dematerialize;

3. The Dematerialize method determines, by looking at the Demat-State of Instance_A, that Instance_A's memory representation has remained unchanged since it was first read from the database. This means that it is unnecessary to physically write Instance_A back out to the database. Thus, the Dematerialize method simply removes the object from memory and returns to the Messenger with an 'OK' status.
4. The Messenger then asks the Object Manager to remove Instance_A from its table of in memory object.
5. The Object Management Table now appears as shown in FIG. 13 where xxxxxxxx are other, arbitrary, unrelated objects also in memory at this time.
6. The system state now appears as shown in FIG. 14.

EXAMPLE 4

Dematerialize: Newly Created Object

Figure 15:
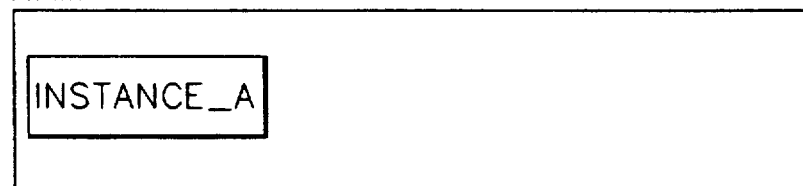
FIGS. 15 through 17 illustrate the contents of volatile and nonvolatile memory and an object list for a second example of a "dematerialize" method according to the present invention.
Figure 15:
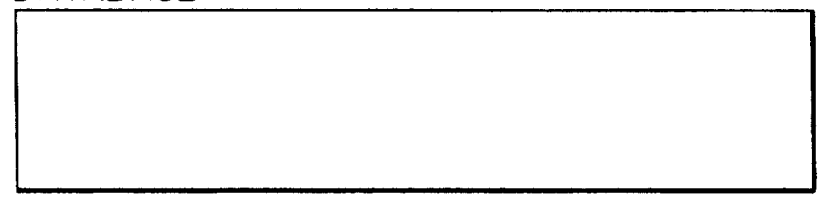

In this Example, a newly created object which does not currently exist in the database, is asked to dematerialize itself (FIG. 15).

Figures 16, 17:
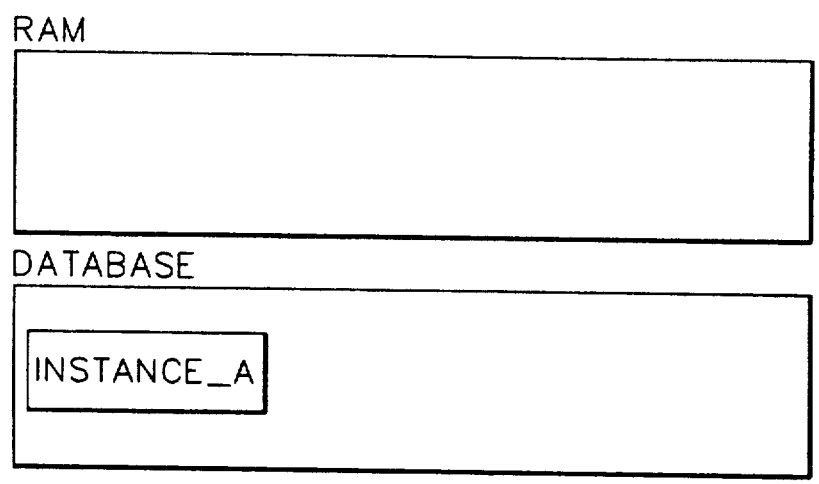

1. Initially, the system state appears as shown in FIG. 15.
2. For some reason, the Messenger decides it is time to dematerialize persistent objects. The Messenger therefore sends a Dematerialize request to Instance_A:

Object.Dematerialize;

3. The Dematerialize method determines, by looking at the Demat_State of Instance_A, that Instance_A is a new instance of Class_A. This means that Instance_A does not yet exist in the database and must be "inserted" as a new row. Thus, the Dematerialize method invokes the DB_Insert method. This message may be:

SELF.DB_Insert;

4. Class_A's DB_Insert method knows how to add new instances of Class_A into the database. Accordingly, DB_Insert adds Instance_A to the database and returns to the Dematerialize method with a success indicator.
5. The Dematerialize method returns to the Messenger indicating success as well.
6. The Messenger then asks the Object Manager to remove Instance_A from its table of in memory objects.
7. The Object Management Table now appears as shown in FIG. 16, where xxxxxxxx are other unrelated objects also in memory at this time.
8. The system state now appears as shown in FIG. 17.

EXAMPLE 5

Dematerialize: Changed Object

In this Example, an object which was earlier materialized from the database is asked to dematerialize itself, and changes have been made to the object while it was in memory (FIG. 18).

Figure 20:
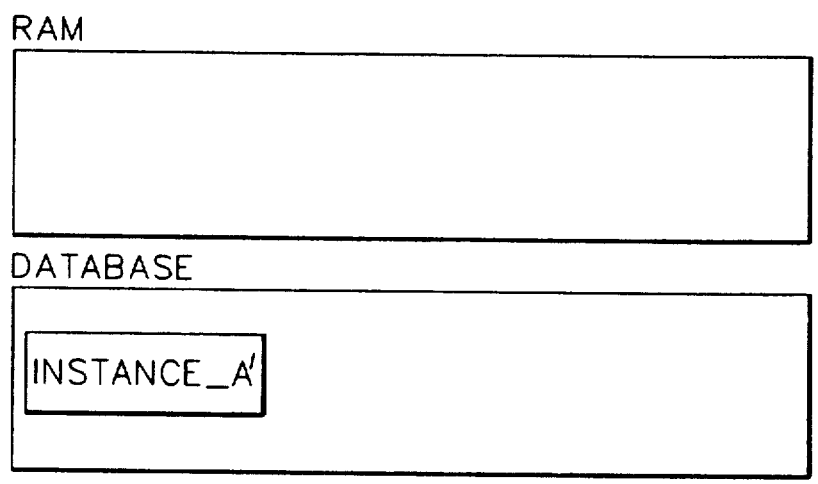

1. Initially, the system state appears as shown in FIG. 18 where Instance_A' is the updated/modified version of Instance_A. Instance_A and Instance_A' are the same instance, meaning they have the same Object ID. However, Instance_A' represents the object at a later time-state than Instance_A.
2. For some reason, the Messenger decides it is time to dematerialize persistent objects. The Messenger therefore sends a Dematerialize request to Instance_A':

Object.Materialize;

3. The Dematerialize method determines, by looking at the Demat_State of Instance_A', that Instance_A' already exists in the database (in the form of Instance_A). This means that Instance_A in the database must be "updated" with the data from Instance_A'. Thus, the Dematerialize method invokes the DB_Update method. This message may be:

SELF.DB_Update;

4. Class_A's DB_Update method knows how to update instances of Class_A in the database. Accordingly, DB_Update updates Instance_A in the database (it now looks exactly like Instance_A') and returns to the Dematerialize method with a success indicator.
5. The Dematerialize method returns to the Messenger indicating success as well.
6. The Messenger then asks the Object Manager to remove Instance_A' from its table of in memory objects.
7. The Object Manager Table now appears as shown in FIG. 19, where xxxxxxxx are other unrelated objects also in memory at this time.
8. The system state now appears as shown in FIG. 20.

EXAMPLE 6

Dematerialize: Object Deleted from Database

Figure 21:
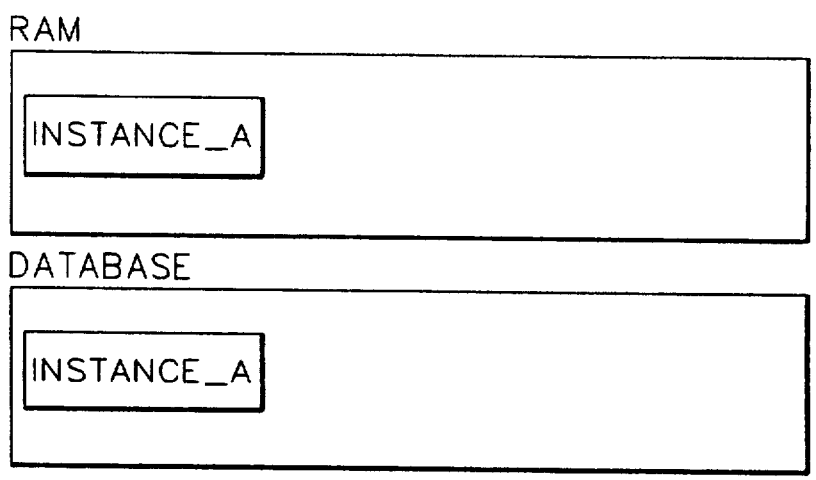
FIGS. 21 through 23 illustrate the contents of volatile and nonvolatile memory and an object list for a fourth example of a "dematerialize" method according to the present invention.

In this Example, an object which was earlier materialized from the database is asked to dematerialize itself, and the object has been asked to delete itself (FIG. 21).

Figures 22, 23:
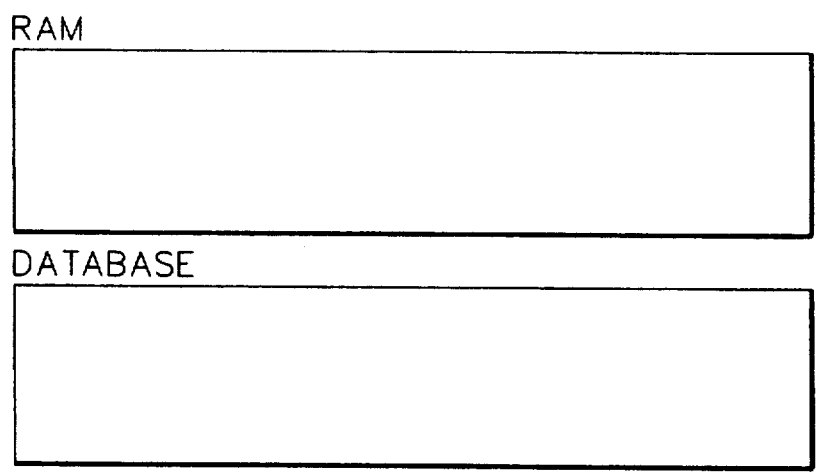

1. Initially, the system state appears as shown in FIG. 11, where Instance_A is the "to be deleted" version of Instance_A.
2. For some reason, the Messenger decides it is time to dematerialize persistent objects. The Messenger therefore sends a Dematerialize request to Instance_A:

Object.Dematerialize;

3. The Dematerialize method determines, by looking at the Demat_State of Instance_A, that Instance_A should be deleted from the database. Thus, the Dematerialize method invokes the DB_Delete method. This message may be:

SELF.DB_Delete;

4. Class_A's DB_Delete method knows how to delete instances of Class_A in the database. Accordingly, DB_Delete deletes Instance_A in the database and returns to the Dematerialize method with a success indicator.
5. The Dematerialize method returns to the Messenger indicating success as well.
6. The Messenger then asks the Object Manager to remove Instance_A from its table of in memory objects.
7. The Object Management Table now appears as shown in FIG. 22 where xxxxxxxx are other unrelated objects also in memory at this time.
8. The system state now appears as shown in FIG. 23.

PSEUDO CODE APPENDIX

The following Appendix contains a pseudo code listing of an implementation of the Persistent Class of the present invention in an object oriented computer system. The pseudo code listing is designed to operate with IBM's well-known Structured Query Language (SQL), described for example in a publication entitled "IBM Database 2 Version 2 SQL Reference Release 1", IBM publication number SC26-4380-0, the disclosure of which is incorporated herein by reference.

APPENDIX

```
package body PERSISTENT is --* deferred

--* The persistent class contains routines to allow objects to be saved in
--* a data repository and later retrieved from the data repository.
--* It also provides the database support for the
--* materialization and dematerialization methods.
--* This class is a client of the Data_Base class.
--*
--* Notes for implementing database access code of deferred methods.
--*   1.  tablename   = your tablename as named by the DBA.
--*   2.  classname   = short name of class.
--*   3.  hostvar     = host variable provided by the include file
--*                     and derived from the table. For consistency
--*                     and maintenance reasons user defined host
--*                     variables should not be used. When your table is
--*                     created by the DBA an include file will be generated
--*                     and will exist on IDSS as AB A100/COL INCLUDE classname.
--*                     This file should be printed and used to complete
--*                     the database access statements.
--*   4.  column      = table column name as named by the DBA.
--*
--*   5.  --*&        = mark of database access statement
--*

-- EXPORT
--   Copy,                              --* defined below
--   Delete,                            --* defined below
--   Dematerialize,                     --* defined below
--   Materialize,                       --* defined below
--   Notify;                            --* defined below -- INHERIT
--   Frame_Class;
-- RENAME
--   XAFRAME_Copy renames Copy,
--   XAFRAME_Notify renames Notify;
-- REDEFINE
--   Copy,
--   Notify;
```

-- class attributes

```
   CANNOT_REMOVE_DELETED_FRAME : exception;
      --* if the Demat_State is set to 'remove' and a message is sent to
      --* Delete, this exception is raised.

CANNOT_UPDATE_DELETED_FRAME : exception;
      --* if the Demat_State is set to 'remove' and a message is sent to
      --* Notify, this exception is raised.

Insert_State : CHAR := 'I';
      --* this is a constant used to set the Demat_State.

INVALID_DEMAT_STATE : exception;
      --* if it is detected that Demat_State has a value other than 'nothing',
      --* 'insert', 'update', or 'remove', this exception is raised.
   INVALID_OBJECT_ID : exception;
      --* the materialze methods has determined that there is no object in the
      --* database with the object id specified.

RC_DTS_Mis_Match : SHORT := -1;
      --* the Date_Time_Stamp (DTS) of the object in memory does not match
      --* the DTS of the object in the data base.

RC_Invalid_OID : SHORT := -2;
      --* the object in memory does not have a corresponding object in the
      --* data base.  the object appears to have been deleted by another unit of
      --* work instance after it was materialized by this unit of work instance.

RC_OK : SHORT := 0;
      --* to indicate that the method completed OK.

Remove_State : CHAR := 'R';
      --* this is a constant used to set the Demat_State.

SQL_ROW_NOT_FOUND : SHORT := 100;
      --* no row found for object id specified.

SQL_OK : SHORT := 0;
      --* sql statement successfully completed.
```

-- instance attributes

```
   Demat_State : CHAR := 'I';
      --* the dematerialization state of the instance.  valid values are 'N' (nothing),
      --* 'I' (insert), 'U' (update), or 'R' (remove).  it tells the dematerialize method
      --* what to do with the object.  Values Nothing_State and Update_State are
      --* defined by XAFRAME.  Values Insert_State and Remove_State are defined
      --* as class attributes in this class.

Last_Update_DTS : String(27);
      --* date-time stamp of last update.
```

-- class methods

```
--*&    EXEC SQL INCLUDE SQLCA;
--*&    EXEC SQL BEGIN DECLARE SECTION;
--*&       EXEC SQL INCLUDE classname;
              --* supplies the correct SQL host variables.
--*&    EXEC SQL END DECLARE SECTION;
```

-- instance methods

```
   function Copy return Frame_Class
      <* (* copy the specified object *) *> is
        New_Instance : Frame_Class;
          --* this is the object id of the new copy
        Save_Demat_State : CHAR;
          --* to save the dematerialization state.  the XAFRAME_Copy needs the demat
          --* state set to Insert_State so that the object newly created by the copy
          --* will be properly added to the database.
        begin
        -- LOGIC
          Save_Demat_State := Demat_State;
        Demat_State := Insert_State;
        New_Instance := SELF.XAFRAME_Copy;
        Demat_State := Save_Demat_State;
        return(New_Instance);
      end;

Procedure Delete
   <* (* set the demat_state of the object to 'remove' *) *> is
     begin
     -- LOGIC
       if
         ( (Demat_State = Update_State)
            or
            (Demat_State = Nothing_State) )
       then
           begin
             Demat_State := Remove_State;
           end;
       else
         begin
           if
             (Demat_State = Insert_State)
           then
              begin
                Demat_State := Nothing_State;
              end;
           else
             begin
               if
                 (Demat_State = Remove_State)
               then
                  begin
                     <* (* Sorry, cannot delete a frame which has already been flagged remove.
                         There is obviously an error somewhere, so raise an exception. *) *> is
                     begin
                       raise CANNOT_REMOVE_DELETED_FRAME;
                     end;
                  end;
               else
                 begin
                    <* (* the Demat_State value is invalid so raise an exception *) *> is
                    begin
                      raise INVALID_DEMAT_STATE;
                    end;
                 end;
               end if;
             end;
```

```
              end if;
          end;
       end if;
    end;

--* the following dematerialize method should never be invoked by an application
--* object.  this method is provided for the sole utilization of the
--* object manager.

procedure Dematerialize (
   RCode : in out Return_Code_Class )
   <* (* decide what to do with the frame based upon the value of the Demat_State *) *> is
   begin
   -- LOGIC
      <* (* figure out what to do in this case *) *> is
         begin
            if
              (Demat_State = Nothing_State)
            then
              begin
                <* (* do nothing *) *>;
              end;
            else
              begin
                CLASS_REF(BADBDBAS).Swich_Plan(SELF);
                if
                  (Demat_State = Update_State)
                then
                  begin
                    <* (* update the object in the database *) *> is
                      begin
                        SELF.DB_Update(RCode);
                      end;
                  end;
                else
                  begin
                    if
                      (Demat_State = Insert_State)
                    then
                      begin
                        <* (* insert this new object into the database *) *> is
                          begin
                            SELF.DB_Insert(RCode);
                          end;
                      end;
                    else
                      begin
                        if
                          (Demat_State = Remove_State)
                        then
                          begin
                            <* (* delete the object from the database *) *> is
                              begin
                                SELF.DB_Delete(RCode);
                              end;
                          end;
                        else
                          begin
                            <* (* the Demat_State value is invalid so raise an exception *) *> is
```

```
                        begin
                          raise INVALID_DEMAT_STATE;
                        end;
                    end;
                  end if;
                end;
              end if;
            end;
          end if;
        end;
      end if;
    end;
  end if;
end;
      if
         (RCode.Num = RC_OK)
      then
         begin
            if
              (Demat_State = Remove_State)
            then
              begin
                CLASS_REF(BAOUMM).UOW_Remove_Object(SELF);
                    --* the object is BIG TIME GONE when we get back from this mesage.
                    --* so don't even think about doing anything else with this object
                    --* after this point.
              end;
            else
              begin
                <* (* set the demat state to 'nothing' so that it will behave
                      properly after it is copied to level 0 by UOW. *) *> is
                  begin
                    Demat_State := Nothing_State;
                  end;
              end;
            end if;
         end;
      end if;
    end;

procedure DB_Insert (
    Rcode : in out Return_Code_Class)

<* (* Execute the appropriate insert statements to satisfy
          the dematerialization request for insert.
          Set the last update date time stamp to the value stored with the
          object on the database. *) *>;

-- DEFERRED

--* Example DB_Insert method logic follows:

--* Remove the --* comment indicators from the below lines when this
--* method is implemented.

--* LOCAL_OBJECT_ID: OBJECT_ID;

--*     begin
--*
--*     -- LOGIC
--*
```

```
--*         <*(* clear out contents of sql host variables  *)*> is
--*           begin
--*               c.memset(OBJID, 0, sizeof(OBJID));
--*
--*              --* add memset statments here for all other sql host variables
--*           end;
--*
--*         <*(* get objectid from frame  *)*> is
--*           begin
--*
--*              LOCAL_OBJECT_ID := SELF.OBJECT_ID;
--*              c.memcpy(OBJID.data,LOCAL_OBJECT_ID,sizeof(OBJID.data));
--*              OBJID.len := c.sizeof(objid.data);
--*           end;
--*
--*      USER, you will have to insert the necessary code here to convert
--*      nls fields to SQL format before it is placed on the database.
--*      Place the formatted data in the appropiate SQL host variable.
--*      If an attribute is not "NLS" then assign to the appropiate SQL
--*      host variable via memcpy, strcpy or direct assignment, which ever applies.
--*           end;
--*
--*&     EXEC SQL
--*&     INSERT INTO tablename
--*&             (OBJID      ,
--*&              UPDT_STMP  ,
--*&              column     ,
--*&                 .        ,
--*&                 .        ,
--*&                 .        ,
--*&                 .        )
--*&         VALUES
--*&              :OBJID          ,
--*&              CURRENT TIMESTAMP,
--*&              :hostvar        ,
--*&              : .             ,
--*&              : .             ,
--*&              : .             ,
--*&              : .             );
--*
--*      if (SQLCODE = SQL_OK)              --* object inserted
--*        then
--*          Rcode.ASSIGN_RC(RC_OK,FALSE);
--*&         EXEC SQL
--*&             SELECT UPDT_STMP
--*&             INTO   :UPDT_STMP
--*&             FROM   tablename
--*&             WHERE OBJID = :OBJID;
--*
--*          c.strcpy(Last_Update_DTS,UPDT_STMP);
--*        else                       --* error accessing database
--*          CLASS_REF(BADBDBAS).SET_LAST_SQL_ERROR(SQLCODE);
--*          raise UNKNOWN_SQL_ERROR;
--*        end if;

--* the following materialize method should never be invoked by an application
  --* object.  this method is provided for the sole utilization of the
  --* object manager to allow it to auto-materialize an object whenever a
  --* message is sent to the object and it is not already in memory.
```

```
procedure Materialize
  <* (* materialize the object from the database into a frame *) *> is
    begin
      -- LOGIC
        <* (* get the data from the database and place it into the frame *) *> is
          begin
            SELF.DB_Select;
          end;
        <* (* set the demat state.  note that it is a non-persistent value and
              is not stored in the database *) *> is
          begin
            Demat_State := Nothing_State;
          end;
    end;

procedure Notify
  <* (* set the demat_state of the object to 'update' if it had a
        previous value of 'nothing'.  This procedure is called before
        any changes are made to an existing object in memory. *) *> is
    begin
      -- LOGIC
        <* (* first, we must let XAFRAME set the "modified data flag" for us *) *> is
          begin
            SELF.xaframe_notify;
          end;
        <* (* next, figure out what to do in this case *) *> is
          begin
            if
              ( (Demat_State = Update_State)
                or
                (Demat_State = Insert_State) )
            then
              begin
                <* (* do nothing *) *>;
              end;
            else
              begin
                if
                  (Demat_State = Nothing_State)
                then
                  begin
                    <* (* set the Demat_State to 'update' *) *> is
                      begin
                        Demat_State := Update_State;
                      end;
                  end;
                else
                  begin
                    if
                      (Demat_State = Remove_State)
                    then
                      begin
                        <* (* Sorry, cannot update a frame which has already been flagged remove.
                              There is obviously an error somewhere, so raise an exception *) *> is
                          begin
                            raise CANNOT_UPDATE_DELETED_FRAME;
                          end;
                      end;
                    else
                      begin
```

```
              <* (* the Demat_State value is invalid so raise an exception *) *> is
                begin
                  raise INVALID_DEMAT_STATE;
                end;
              end;
            end if;
          end;
        end if;
      end;
          end if;
        end;
      end;

procedure DB_Delete (
      Rcode : in out Return_Code_Class)
      <* (* Executes the appropriate sql statements to satisfy
            the dematerialization request for delete.

If (the timestamps of the frame and the object in the
                database are equal   (ie Last_Update_Dts is same in
                database and memory;))
            then if (the object's mode is such that it is OK for this
            user to remove it), then (erase the object from the
            database;) *) *>;
      -- DEFERRED --* example Remove method logic follows:

--* Remove the --* comment indicators from the below lines when this
--* method is implemented.

--*  . LOCAL_OBJECT_ID: OBJECT_ID;
--*
--*    begin
--*
--*    -- LOGIC
--*
--*       <*(* get objectid from frame    *)*> is
--*         begin
--*           LOCAL_OBJECT_ID  := SELF.OBJECT_ID;
--*           c.memcpy(OBJID.data,LOCAL_OBJECT_ID,sizeof(OBJID.data));
--*           OBJID.len := c.sizeof(OBJID.data);
--*         end;
--*
--*    <*(* get last update time from frame  *)*> is
--*      begin
--*        c.strcpy(UPDT_STMP, Last_Update_DTS);
--*      end;
--*
--*&       EXEC SQL
--*&           DELETE
--*&           FROM tablename
--*&           WHERE OBJID    = :OBJID
--*&           AND UPDT_STMP = :UPDT_STMP;
--*
--*         if (SQLCODE = SQL_OK)                   --* object deleted
--*           then Rcode.Assign_Rc(RC_OK,FALSE);
--*         else
--*           if (SQLCODE = SQL_ROW_NOT_FOUND) then --* delete failed
--*             begin
```

```
--*&            EXEC SQL
--*&              SELECT OBJID
--*&              INTO :OBJID
--*&              FROM  tablename
--*&              WHERE OBJID = :OBJID;
--*
--*            if (SQLCODE = SQL_OK)    --*time stamp mismatch
--*              then Rcode.Assign_Rc(RC_DTS_Mis_Match,FALSE);
--*              else
--*                if (SQLCODE = SQL_ROW_NOT_FOUND)  --* Invalid objectid
--*                  then
--*                  Rcode.Assign_Rc(RC_Invalid_OID,FALSE);
--*                  else                      --* error accessing database
--*                  begin
--*                    CLASS_REF(BADBDBAS).SET_LAST_SQL_ERROR(SQLCODE);
--*                    raise UNKNOWN_SQL_ERROR;
--*                  end;
--*                end if;
--*              end if;
--*          end;
--*          else
--*            CLASS_REF(BADBDBAS).SET_LAST_SQL_ERROR(SQLCODE);
--*            raise UNKNOWN_SQL_ERROR;
--*          end if;
--*        end if;
``` procedure DB_Select
  <* (* Execute the sql select statements to satisfy the
      materialization request.

.       if (the object's mode is such that it is OK for this user to retrieve it)
        then retrieve object attributes from the database.

raise the INVALID_OBJECT_ID exception if the object does not exist in the
        database at all. *) *>;
  -- DEFERRED --* Example DB_Select method logic follows:

--* Remove the --* comment indicators from the below lines when this
--* method is implemented.

```
--*     LOCAL_OBJECT_ID: OBJECT_ID;
--*
--*   begin
--*
--*   -- LOGIC
--*
--*     <*(* get objectid from frame *)*> is
--*       begin
--*         LOCAL_OBJECT_ID := SELF.OBJECT_ID;
--*         c.memcpy(OBJID.data,LOCAL_OBJECT_ID,sizeof(OBJID.data));
--*         OBJID.len := c.sizeof(OBJID.data);
--*       end;
--*
--*&        EXEC SQL
--*&          SELECT
--*&            UPDT_STMP ,
--*&            column ,
--*&              .      ,
```

```
--*&                  .         ,
--*&                  .         ,
--*&                  .
--*&        INTO
--*&            :UPDT_STMP ,
--*&            :hostvar   ,
--*&            : .        ,
--*&            : .        ,
--*&            : .        ,
--*&            : .        ,
--*&        FROM   tablename
--*&        WHERE OBJID = :OBJID;
--*
--*         if (SQLCODE = SQL_OK) then       --* object retrieved
--*           begin
--*             c.strcpy(Last_Update_DTS, UPDT_STMP);
--*
--*     USER, you will have to insert the necessary code here to convert
--*     data retrieved from the database to "NLS" format where applicable.
--*     Place the formatted data in the appropiate instance attribute.
--*     If an attribute is not "NLS" then assign to instance attribute via
--*     strcpy, memcpy, or direct assignment, which ever applies.
--*
--*           end;
--*         else
--*           if (SQLCODE = SQL_ROW_NOT_FOUND)   --* object does not exist
--*             then
--*                 raise INVALID_OBJECT_ID;
--*             else                              --* error accessing database
--*               begin
--*                 CLASS_REF(BADBDBAS).SET_LAST_SQL_ERROR(SQLCODE);
--*                 raise UNKNOWN_SQL_ERROR;
--*               end;
--*           end if;
--*        end if;

procedure DB_Update (
     Rcode : in out Return_Code_Class)
     <* (* Execute the appropriate sql statements to satisfy
           the dematerialization request for update.

If (the timestamps of the frame and the object in the
                 database are equal  (ie Last_Update_Dts is same in
                 database and memory;))
             then if (the object's mode is such that it is OK for the this user to update it)
                 then (update the timestamp in the frame, then use the
                       object image from the frame in memory to rewrite it
                       to the database.

Set the last update date time stamp to the value stored with the
           object on the database.  *) *>;
     -- DEFERRED --* example DB_Update method logic follows:

--*     LOCAL_OBJECT_ID: OBJECT_ID;
--*
--* begin
--*
```

```
--*   -- LOGIC
--*
--*    <*(* clear out contents of sql host variables *)*> is
--*      begin
--*        c.memset(OBJID, 0, sizeof(OBJID));
--*    --* add memset statments here for all other sql host variables
--*      end;
--*
--*    <*(* get objectid from frame *)*> is
--*      begin
--*        LOCAL_OBJECT_ID  := SELF.OBJECT_ID;
--*        c.memcpy(OBJID.data,LOCAL_OBJECT_ID,sizeof(OBJID.data));
--*        OBJID.len := c.sizeof(OBJID.data);
--*      end;
--*
--*    <*(* get last update time from frame *)*> is
--*      begin
--*        c.strcpy(UPDT_STMP, Last_Update_DTS);
--*      end;
--*
--*  USER, you will have to insert the necessary code here to convert
--*  nls fields to database format before it is placed on the database.
--*  Place the formatted data in the appropiate host variable.
--*  If an attribute is not "NLS" then assign to the appropiate SQL
--*  host variable via memcpy, strcpy or direct assignment, which ever applies.
--*
--*&        EXEC SQL
--*&            UPDATE tablename
--*&.           SET
--*&                UPDT_STMP      =  CURRENT TIMESTAMP,
--*&                column         = :hostvar         ,
--*&                .              = : .              ,
--*&                .              = : .              ,
--*&                .              = : .              ,
--*&                .              = : .              ,
--*&            WHERE OBJID     = :OBJID
--*&            AND UPDT_STMP  = :UPDT_STMP;
--*
--*   if (SQLCODE = SQL_OK)                     --* object updated
--*     then
--*        Rc.Assign_RC(RC_OK,FALSE);
--*&        EXEC SQL
--*&            SELECT UPDT_STMP
--*&            INTO :UPDT_STMP
--*&            FROM  tablename
--*&            WHERE OBJID = :OBJID;
--*
--*        c.strcpy(Last_Update_DTS,UPDT_STMP);
--*   else
--*    if (SQLCODE = SQL_ROW_NOT_FOUND) then    --* update failed
--*      begin
--*&        EXEC SQL
--*&            SELECT OBJID
--*&            INTO :OBJID
--*&            FROM  tablename
--*&            WHERE OBJID = :OBJID;
--*
--*            if (SQLCODE = SQL_OK)      --*time stamp mismatch
--*              then Rcode.Assign_Rc(RC_DTS_Mis_Match,FALSE);
```

```
--*            else
--*              if (SQLCODE = SQL_ROW_NOT_FOUND)  --* invalid objectid
--*              then
--*                Rcode.Assign_Rc(RC_Invalid_OID,FALSE);
--*              else                              --* error accessing database
--*              begin
--*                CLASS_REF(BADBDBAS).SET_LAST_SQL_ERROR(SQLCODE);
--*                raise UNKNOWN_SQL_ERROR;
--*              end;
--*              end if;
--*            end if;
--*        end;
--*        else                              --* error accessing database
--*          CLASS_REF(BADBDBAS).SET_LAST_SQL_ERROR(SQLCODE);
--*          raise UNKNOWN_SQL_ERROR;
--*      end if;
--*  end if;

end Persistent;
```

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim is:

1. An object oriented computer system comprising:
   a nonvolatile data storage device;
   a volatile data storage device; and
   an object oriented data processor connected to said nonvolatile data storage device and to said volatile data storage device, said object oriented data processor comprising:
   a plurality of object, each of which comprises a frame and at least one method for encapsulating said frame, said frame comprising a plurality of attributes of said object, said at least one method for encapsulating said frame comprising at least one function performed upon selection attributes in the encapsulated frame;
   said plurality of objects being arranged in a hierarchy of parent and child objects, wherein a child object inherits the attributes and encapsulating methods of a parent object;
   said plurality of objects including a persistent class object comprising at least one encapsulating persistent class method for storing a designated object located in said nonvolatile data storage device into said volatile storage device and for storing a designated object located in said volatile data storage device into said nonvolatile data storage device;
   selected ones of said plurality of objects being arranged to be a child object of said persistent class object and to thereby inherit the attributes and encapsulating methods of said persistent class object, such that said selected ones of said plurality of objects are automatically stored in said volatile storage device whenever referenced, independent of periodic checkpoint times, and all changes to said selected ones of said plurality of objects are automatically stored in said nonvolatile data storage device, independent of periodic checkpoint times.

2. The object oriented computer system of claim 1, wherein said at least one persistent class method comprises:
   a first method for materializing a designated object into said volatile data storage device; and
   a second method for dematerializing a designated object from said nonvolatile data storage device.

3. The object oriented computer system of claim 2 wherein said first method comprises:
   means for determining whether said designated object is located in said nonvolatile data storage device; and
   means for storing said designated object located in said nonvolatile data storage device into said volatile data storage device, if said designated object is located in said nonvolatile data storage device.

4. The object oriented computer system of claim 3 wherein said first method further comprises:
   means for producing an error code if said designated object is not located in said nonvolatile data storage device.

5. The object oriented computer system of claim 2 wherein said second method comprises:
   means for determining whether changes have been made to said designated object while said designated object was located in said volatile data storage device; and
   means for removing said designated object from said volatile data storage device only if no changes have been made to said designated object while said designated object was located in said volatile data storage device.

6. The object oriented computer system of claim 5 wherein said second method further comprises:
   means for replacing said designated object in said nonvolatile data storage device with said designated object in said volatile data storage device if changes have been made to said designated object while said designated object was located in said volatile data storage device.

7. The object oriented computer system of claim 2 wherein said first method comprises:
   means for determining whether said designated object is located in said nonvolatile data storage device; and means for producing an error code if said designated object is not located in said nonvolatile data storage device.

8. The object oriented computer system of claim 2 wherein said second method comprises:
   means for determining whether changes have been made to said designated object while said designated object was located in said volatile data storage device; and
   means for replacing said designated object in said nonvolatile data storage device with said designated object in said volatile data storage device only if changes have been made to said designated object while said designated object was located in said volatile data storage device.

9. The object oriented computer system of claim 2 wherein said second method comprises:
   means for determining whether said designated object was newly created in said volatile data storage device; and
   means for storing said designated object in said nonvolatile data storage device if said designated object was newly created in said volatile storage device.

10. The object oriented computer system of claim 2 wherein said second method comprises:
   means for determining whether said designated object is located in said nonvolatile data storage device;
   means for storing said designated object in said nonvolatile data storage device if said designated object is not located in said nonvolatile data storage device;
   means for determining if said designated object was changed while located in said volatile data storage device if said designated object is located in said nonvolatile data storage device;
   means for erasing said designated object from said volatile data storage device if said designated object was not changed while located in said volatile data storage device; and
   means for replacing said designated object in said nonvolatile data storage device with said designated object in said volatile data storage device if said designated object was changed while located in said volatile data storage device.

11. The object oriented computer system of claim 1 wherein said volatile data storage device comprises a random access memory.

12. The object oriented computer system of claim 1 wherein said nonvolatile data storage device comprises a direct access storage device.

13. In an object oriented computer system comprising a volatile data storage device, a nonvolatile data storage device, and an object oriented data processor connected to said nonvolatile and said volatile data storage devices, and containing a plurality of objects, each of which includes a frame and at least one method for encapsulating said frame, a process comprising the following steps performed by said object oriented computer system;
   providing a persistent class object in said object oriented data processor; and
   arranging said selected ones of said plurality of objects in said object oriented data processor to inherit from said persistent class object in said object oriented data processor, wherein said selected ones of said plurality of objects inherit the attributes and encapsulating methods of said persistent class object, such that said selected ones of said plurality of objects are automatically stored in said volatile storage device whenever referenced, independent of periodic checkpoint times and all changes to said selected ones of said plurality of objects are automatically stored in said nonvolatile data storage device, independent of periodic checkpoint times.

14. The process of claim 13 wherein said step of providing a persistent class object comprises the step of providing a persistent class object having a first persistent class method for performing the step of materializing a designated object into said nonvolatile data storage device, and a second persistent class method for performing the step of dematerializing a designated object from said nonvolatile data storage device.

15. The process of claim 14 wherein said step of providing a persistent class object comprises the step of providing a persistent class object having a first method for performing the steps of:
   determining whether said designated object is located in said nonvolatile data storage device; and
   producing an error code if said designated object is not located in said nonvolatile data storage device.

16. The process of claim 15 wherein said step of providing a persistent class object comprises the step of providing a persistent class object having a first method for performing the further step of:
   producing an error code if said designated object is not located in said nonvolatile data storage device.

17. The process of claim 14 wherein said step of providing a persistent class object comprises the step of providing a persistent class object having a second method for performing the steps of:
   determining whether changes have been made to said designated object while said designated object was located in said volatile data storage device; and
   removing said designated object from said volatile data storage device only if no changes have been made to said designated object while said designated object was located in said volatile data storage device.

18. The process of claim 17 wherein said step of providing a persistent class object comprises the step of providing a persistent class object having a second method for performing the further step of:
   replacing said designated object in said nonvolatile data storage device with said designated object in said volatile data storage device if changes have been made to said designated object while said designated object was located in said volatile data storage device.

19. The process of claim 14 wherein said step of providing a persistent class object comprises the step of providing a persistent class object having a first method for performing the steps of:
   determining whether said designated object is located in said nonvolatile data storage device; and
   storing said designated object located in said nonvolatile data storage device into said volatile data storage device, if said designated object is located in said nonvolatile data storage device.

20. The process of claim 14 wherein said step of providing a persistent class object comprises the step of providing a persistent class object having a second method for performing the steps of:
- determining whether changes have been made to said designated object while said designated object was located in said volatile data storage device; and
- replacing said designated object in said nonvolatile data storage device with said designated object in said volatile data storage device only if changes have been made to said designated object while said designated object was located in said volatile data storage device.

21. The process of claim 14 wherein said step of providing a persistent class object comprises the step of providing a persistent class object having a second method for performing the steps of:
- determining whether said designated object was newly created in said volatile data storage device; and
- storing said designated object in said nonvolatile data storage device if said designated object was newly created in said volatile storage device.

22. The process of claim 14 wherein said step of providing a persistent class object comprises the step of providing a persistent class object having a second method for performing the steps of:
- determining whether said designated object is located in said nonvolatile data storage device;
- storing said designated object in said nonvolatile data storage device if said designated object is not located in said nonvolatile data storage device;
- determining if said designated object was changed while located in said volatile data storage device if said designated object is located in said nonvolatile data storage device;
- erasing said designated object from said volatile data storage device if said designated object was not changed while located in said volatile data storage device; and
- replacing said designated object in said nonvolatile data storage device with said designated object in said volatile data storage device if said designated object was changed while located in said volatile data storage device.

23. The process of claim 13 wherein said step of providing a persistent class object comprises the step of providing a persistent class object having a method for performing the steps of storing a designated object located in said nonvolatile data storage device into said volatile data storage device and storing a designated object located in said volatile data storage device into said nonvolatile data storage device.

24. A persistent class object executing on an object oriented computer system, said object oriented computer system comprising a nonvolatile data storage device, a volatile data storage device and an object oriented data processor connected to said nonvolatile data storage device and to said volatile data storage device, said persistent class object executing on said object oriented computer system comprising:
- a first persistent class method executing on said object oriented computer system for automatically materializing a designated object located in said nonvolatile data storage device into said volatile data storage device when designated, independent of periodic checkpoint times; and
- a second persistent class method executing on said object oriented computer system for dematerializing a designated object located in said volatile data storage device into said nonvolatile data storage device and automatically storing all changes to said designated objects while in said volatile data storage into said nonvolatile data storage device, independent of periodic checkpoint times.

25. The persistent class object of claim 24 wherein said first method comprises:
- means for determining whether said designated object is located in said nonvolatile data storage device; and
- means for storing said designated object located in said nonvolatile data storage device into said volatile data storage device, if said designated object is located in said nonvolatile data storage device.

26. The persistent class object of class 25 wherein said first method further comprises:
- means for producing an error code if said designated object is not located in said nonvolatile data storage device.

27. The persistent class object of claim 24 wherein said second method comprises:
- means for determining whether changes have been made to said designated object while said designated object was located in said volatile data storage device; and
- means for removing said designated object from said volatile data storage device only if no changes have been made to said designated object while said designated object was located in said volatile data storage device.

28. The persistent class object of claim 27 wherein said second method further comprises:
- means for replacing said designated object in said nonvolatile data storage device with said designated object in said volatile data storage device if changes have been made to said designated object while said designated object was located in said volatile data storage device.

29. The persistent class object of claim 24 wherein said first method comprises:
- means for determining whether said designated object is not located in said nonvolatile data storage device; and
- means for producing an error code if said designated object is not located in said nonvolatile data storage device.

30. The persistent class object of claim 24 wherein said second method comprises:
- means for determining whether changes have been made to said designated object while said designated object was located in said volatile data storage device; and
- means for replacing said designated object in said nonvolatile data storage device with said designated object in said volatile data storage device only if changes have been made to said designated object while said designated object was located in said volatile data storage device.

31. The persistent class object of claim 24 wherein said second method comprises:
- means for determining whether said designated object was newly created in said volatile data storage device; and
- means for storing said designated object in said nonvolatile data storage device if said designated object was newly created in said volatile storage device.

32. The persistent class object of claim 24 wherein said second method comprises:
- means for determining whether said designated object is located in said nonvolatile data storage device;
- means for storing said designated object in said nonvolatile data storage device if said designated object is not located in said nonvolatile data storage device;
- means for determining if said designated object was changed while located in said volatile data storage device if said designated object is located in said nonvolatile data storage device;
- means for erasing said designated object from said volatile data storage device if said designated object was not changed while located in said volatile data storage device; and
- means for replacing said designated object in said nonvolatile data storage device with said designated object in said volatile data storage device if said designated object was changed while located in said volatile data storage device.

* * * * *